July 11, 1961  R. L. LINCOLN  2,991,979
GAS-LIQUID HEAT EXCHANGER
Filed Nov. 15, 1957
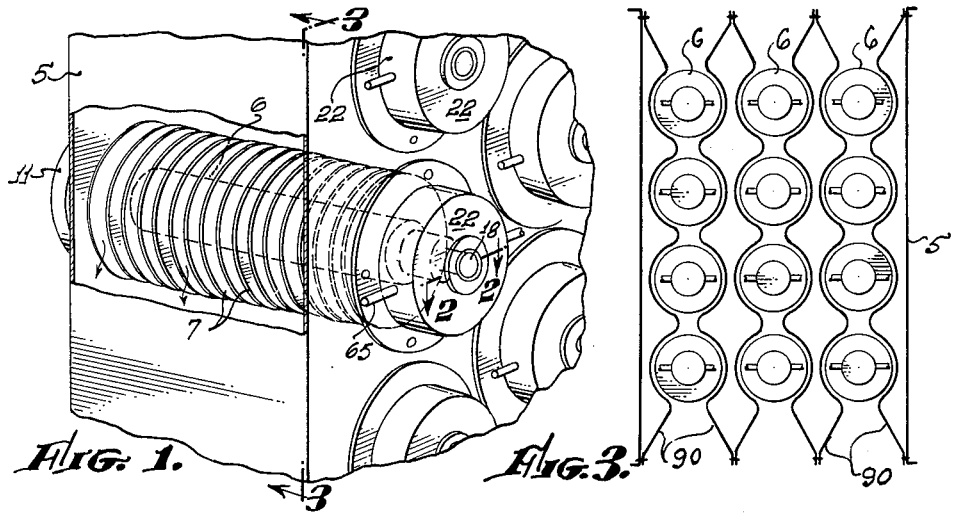
FIG. 1.
FIG. 3.
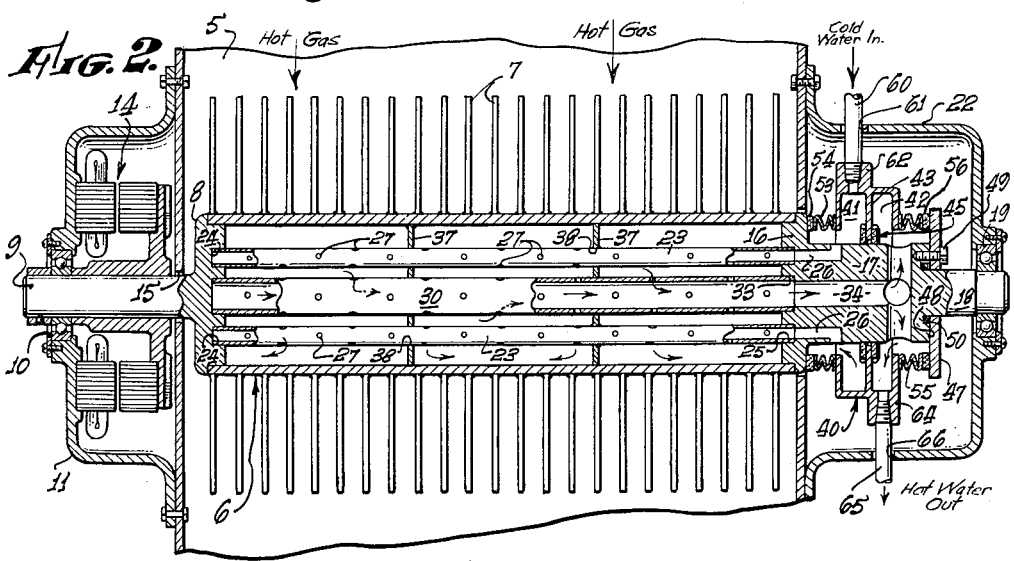
FIG. 2.
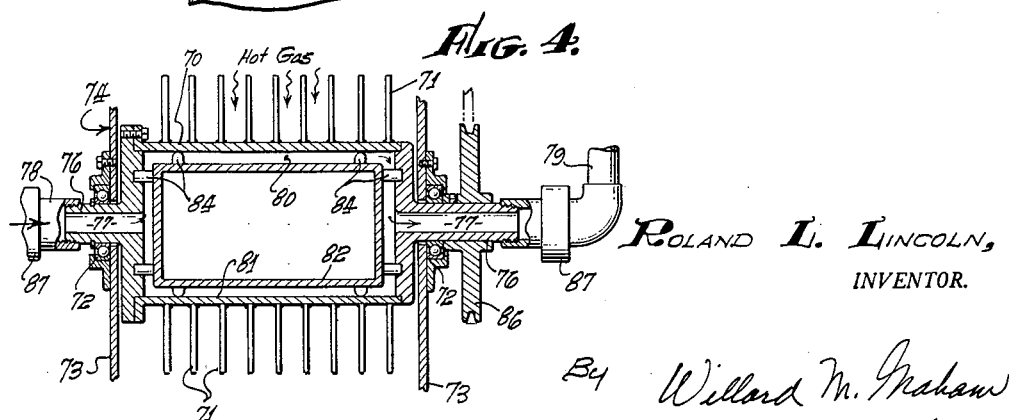
FIG. 4.
ROLAND L. LINCOLN,
INVENTOR.
By Willard M. Graham
AGENT.

United States Patent Office 2,991,979
Patented July 11, 1961

2,991,979
GAS-LIQUID HEAT EXCHANGER
Roland L. Lincoln, Palos Verdes Estates, Calif.
(Box 141, Rte. 1, Macungie, Pa.)
Filed Nov. 15, 1957, Ser. No. 696,871
3 Claims. (Cl. 257—95)

My present invention relates to heat exchangers and more particularly to a novel and efficient heat exchange device which is ideally suited for use as an economizer in a power plant to heat boiler feed water, for example.

The design and construction of equipment for recovering heat from combustion gases being carried away from steam boiler furnaces as used in power plants, industrial plants, and the like, to heat air being supplied to support combustion of fuel in the furnaces, constitutes one of the most important, expensive, and troublesome problems in the field today. In my previous patent application, Serial No. 438,791, filed June 23, 1954, entitled "Heat Exchanger," now U.S. Patent No. 2,813,698, granted November 19, 1957, I describe a few of the problems and disadvantages found in such equipment wherein inspection, cleaning, repair and replacement makes heat recovery a very costly item.

In my above patent, I have disclosed heat exchange apparatus which overcomes most of the problems enumerated above, the heat exchange apparatus embodied therein being suitable for use as an air preheater to transfer heat from a hot gas such as escaping combustion gas from a steam boiler furnace to a lower temperature gas such as cold air being supplied to support combustion in the aforesaid steam boiler furnace, for example.

Based upon similar fundamental principles, it is an object of my present invention, in one preferred embodiment thereof, to provide heat exchange apparatus which will efficiently transfer heat from a steam of hot gas to cold liquids.

It is another object of my present invention to provide new and novel heat transfer apparatus which is flexible in design and capable of use in multiple units for large volume processing.

It is a still further object of my present invention to provide heat exchanger apparatus for use as an economizer in power plants which is capable of use in series relationship or in parallel relationship.

It is yet a further object of my present invention to provide heat exchange apparatus which is relatively inexpensive to construct, easy to service and maintain, and which will require only a minimum of maintenance.

Many other features and advantages inherent in my invention will be seen as the specification continues.

Briefly, my invention, in one preferred form thereof, comprises a generally tubular heat exchanger element mounted in a hot gas duct, the element being driven to rotate at high speed about its axis in the duct. There is provided means for conveying cold liquid to the interior of the heat exchanger element and uniformly distributing the liquid over the interior surface thereof; heat from the hot gas being conducted through the wall of the heat exchanger element to heat the cold liquid. There is also provided return means for collecting and conveying the heated water away from the interior of the heat exchanger.

My invention will be more clearly understood by reference to the appended drawings wherein:

FIGURE 1 is a fragmentary cutaway view in perspective showing a preferred installation of a number of units of my present invention.

FIGURE 2 is a cross-section view of my invention taken along 2—2 of FIGURE 1 showing one preferred construction of a single unit gas-liquid heat exchanger in accordance with my invention.

FIGURE 3 is an end elevation view of a plurality of heat exchanger units mounted in a hot gas duct in alternate arrangement showing the use of shrouds to direct the flow of gas around the units.

FIGURE 4 is a side elevation view in cross section showing a simplified structural modification of my invention.

Referring first to FIGURE 1, there is shown a casing or duct 5 that conveys hot gas such as combustion gas from a furnace or the like to atmosphere in the usual manner. In the duct 5, and in the stream of hot gas carried therein as indicated, I mount a hollow heat exchanger cylinder which I will hereinafter refer to as rotor 6. As shown in FIGURES 1 and 2, rotor 6 is a cylinder of uniform diameter and can be made of steel or other suitable heat conducting material. To obtain maximum heat transfer, circular fins 7 can be mounted around the exterior of rotor 6 in any desired manner as is well known in the art, these fins 7 being made of copper, aluminum or other suitable heat conducting material.

Rotor 6 is mounted to rotate in duct 5, being enclosed at the driving end thereof by a cap 8 having a drive shaft 9 extending therefrom. Shaft 9 is supported in bearing 10 which is in turn mounted in a motor housing 11 fastened to the exterior of duct 5. Motor housing 11 preferably encloses an electric motor 14 of the axial gap type, although it is to be understood that any suitable type of driving means can be employed, such as turbines, gear boxes, belts, etc., if desired. The opening 15 in duct 5 through which shaft 9 extends into motor housing 11 can be sealed in any well known manner to prevent hot gas from duct 5 entering the motor housing 11.

The other end of rotor 6 is enclosed by a cap 16 having a manifold 17 extending therefrom. Extending from manifold 17 a shaft 18 is rotatably supported in a bearing 19 which is in turn mounted in a housing 22 fastened to the exterior of casing 5 in a manner similar to motor housing 11.

To convey cold liquids such as boiler feed water, to the interior of heat exchanger rotor 6 to be heated, I provide distribution conduits or pipes 23 arranged between the center of rotor 6 and the rotor wall. Any desired number of distribution pipes 23 can be used, two of four being visible in the cross-section view shown herein. One end of each pipe 23 is recessed in cap 8 in recesses 24 provided therefor. At the other end of each pipe 23 there is also provided recesses 25 in cap 16, which recesses 25 connect with fluid supply passages 26 provided in manifold 17.

Distribution pipes 23 are provided along their entire extents with flow ports 27 through which cold liquid is equally or uniformly diffused and distributed for circulation over the interior surface of rotor 6 to be heated thereby.

In the center of rotor 6, preferably on the axis of rotation thereof, a return or collector pipe 30 is provided, being mounted at one end thereof in a recess in cap 8 in the same manner as distribution pipes 23, and having flow ports 31 along the entire extent thereof. The other end of return pipe 30 is mounted in a recess 33 in cap 16 which connects with multiple outlet return passage 34. The pipes 23 and pipe 30 can be supported intermediate the ends of rotor 6, if desired, by support disks 37 having apertures 38 through which the pipes 23 and 30 can be extended for support.

Manifold 17 is enclosed by an annular reservoir 40 which is divided into two compartments or chambers 41 and 42 by a central partition 43. Around the aperture of partition 43 there is provided a double seal 45 made of any suitable waterproof material, the seal being mounted or fastened to the partition 43 in any convenient manner and preferably being in watertight contact around the periphery of the manifold 17 as shown. Supply passages 26 provide fluid connections between chamber 41 to supply pipes 23, and multiple outlet 34 provides the fluid connection to chamber 42.

To complete the enclosing of the chambers 41 and 42, I provide an end plate 47 fastened over the end of manifold 17 and abutting shoulder 48 defined where shaft 18 extends from manifold 17 into the bearing 19. End plate 47 is preferably secured in place by means of a screw 49 and rotates with shaft 18. An O ring seal 50 is provided, being recessed and retained in an annular groove at the base of shaft 18 which makes a waterproof seal therearound.

Extending across the space between reservoir 40 and cap 16, an accordion-type flexible seal 53 is provided, being welded or otherwise bonded to the exterior of reservoir 40 at one end and provided with an annular friction seal 54 at the other end thereof, the seal 54 being made of carbon or other suitable material and fastened thereon in any convenient manner. Thus rotor 6 is free to rotate with end cap 16 making a friction seal against the stationary carbon seal 54.

Between reservoir 40 and end plate 47, another accordion-type seal 55 is provided, fastened to reservoir 40 and having a carbon friction seal 56 in sealing engagement with the adjacent face of rotatable end plate 47 in the same relationship as in the aforesaid accordion seal 53 on the opposite side of reservoir 40 described above.

It can thus be seen that the above novel sealing assembly will permit expansion and contraction of rotor 6 along the longitudinal axis thereof without binding any point of support, and without breaking any sealing connections. In effect, rotor 6 is maintained in floating supports relative to all fluid connections.

While the apparatus and construction of FIGURE 2 sets forth one preferred embodiment of my invention, other modified forms of apparatus incorporating the gist and spirit of my invention can be constructed, for example, as illustrated by the simplified structure shown in FIGURE 4 wherein a rotor 70 with circular fins 71 is supported at each end thereof in bearings 72 mounted in opposite walls 73 of a duct 74 carrying hot gas in essentially the same manner as in the apparatus of FIGURE 2. The shafts 76 extending from each end of rotor 6 and supported in bearings 72 each have a central fluid passage 77 extending therethrough leading from fluid pipe 78 conveying cold liquid to the interior of rotor 6 on one end thereof, and carrying heated liquid from the interior of rotor 6 to return pipe 79 at the other end thereof. The liquid is confined and circulated in the interior of rotor 6 in heat exchange relation to the interior surface of rotor 6 within an annular chamber 80 adjacent the interior wall 81 of rotor 6 by an inner cylinder 82 mounted and secured within rotor 6 by spacer pins 84.

Rotor 6 can be rotated from outside duct 74 by means of a belt driver pulley 86 for example, mounted on shaft 76. Rotatable, sealed pipe joints 87 must, of course, be provided at each fluid connection, i.e., at supply pipe 78 and return pipe 79, in any well known manner.

Thus cold liquid is supplied to chamber 80, taking heat from the wall of rotor 6, and the heated liquid is then directed into return pipe 79, in a continuous process.

Having thus described in complete detail two possible structural embodiments of my present invention, the general operation will be described with reference to FIGURES 1 and 2 of the drawings.

As hot air passes through duct 5, rotor 6 is rotated at any desired r.p.m., heat being absorbed by fins 7 and conducted thereby to the rotor 6 and to the interior thereof.

Cold liquid such as boiler feed water is conveyed by main supply pipe 60 into cold liquid chamber 41 and passed through passages 26 in manifold 17 into distribution pipes 23. The cold fluid is then diffused and distributed uniformly over the hot interior surface of rotor 6 through flow ports 23. By circulation over the interior wall surface of rotor 6 the liquid takes on heat from contact with the surface and the density of the liquid decreases as is well known; the lighter heated liquid then tends to move toward the center of rotor 6 wherein collector pipe 30 takes the heated liquid through its flow ports and conveys the hot liquid through passage 34 and into hot liquid chamber 42 from whence hot water return pipe 65 carries the hot water to the place of its use. The process, as will be readily understood by skilled artisans, is not cyclic but continuous and will efficiently heat cold liquid circulated through rotor 6 which, during the process, is rotated in hot gas to promote better heat transfer between the hot gas and the heat exchanger surface. It will further be clearly seen by those skilled in the art that the heavier cold water will always tend to be circulated next to the interior surface of rotor 6 due in part to its heavier weight, and in part to the centrifugal force developed by the spinning or rotating rotor.

All of the advantages ascribed to my heat exchanger described, shown and claimed in U.S. Patent No. 2,813,-698, dated November 19, 1957, will apply equally to my present invention, i.e. since the velocity differential between hot fluid such as gas and a heat exchanger in heat transfer relation therewith enhances the coefficient of heat transfer, rotation of rotor 6 will result in an appreciably higher heat transfer rate regardless of the velocity of the gases in duct 5, for a lower expenditure of energy.

Moreover, by controlling the speed of rotation of rotor 6 not shown or described herein, but shown and described in my U.S. Patent 2,813,698 referred to above, the gas temperature in duct 5 can be maintained at a temperature well above the temperature at which moisture condenses out of the gas, and since condensation can result in corrosive acids being deposited on the exterior surfaces of fins 7 and rotor 6, corrosion thereof can be avoided.

Reference is now made to FIGURE 3. There is provided, if desired, and regardless of the particular form my invention may take, a number of thin walled shrouds 90 placed between rows of heat exchange elements 6. Shrouds 90 generally follow the contour of the heat exchange elements 51 and are spaced therefrom so as to direct the flow of hot gas thereover in more efficient heat exchange relationship to the exposed surfaces of the rotors and fins, as will be readily seen by those skilled in the art. Dampers (not shown) can be provided, if desired, at either end of the shrouds, and individually operated to close off one or more of the passages between the shrouds if necessary.

While I have described and shown my invention as applied to the process of transferring heat from hot gas to cold liquid, it will be obvious to those skilled in the art that my invention will have equal utility in a process whereby hot liquid can be employed to heat a stream of cold gas. In other words, by reversing the thermal relation of the gas and the liquid, it is clear that if hot liquid is supplied to the interior of rotor 6, employing the same apparatus described herein, a stream of cold gas moving through duct 5 will absorb the heat transferred through the wall of rotor 6 and fins 7 of FIGURES 2 and 3. Moreover, it will further be obvious to those skilled in the art, that if cold liquid is supplied to the interior of rotor 6 at a properly controlled rate, the liquid will move to the center of the rotor in a vaporized state, and thus, in effect be vented rather than conveyed from the interior of rotor 6 by collector pipe 30 in a vaporized state, thus providing a steam generator.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A gas to liquid heat exchanger combination comprising: a duct carrying hot gas, a hollow heat exchange rotor horizontally mounted for high speed rotation in said duct, a plurality of fluid distributing pipes perforated along their entire length and coaxially mounted and spaced around the interior of said rotor, a supply of cold fluid connected at one end of each of said fluid distributing pipes to be uniformly distributed for circulation over the interior wall of said rotor to absorb heat therefrom, a fluid collecting pipe perforated along its entire length mounted in the interior of said rotor along the axis thereof, said fluid collecting pipe being connected at one end thereof to a fluid outlet pipe, and means rotating said rotor at high speed sufficient to generate centrifugal force that uniformly circulates cold fluid distributed by said fluid distributing pipes over the entire interior wall surface of said rotor, whereby heated fluid is forced from the wall of said rotor to the center of said rotor by the circulating cold fluid and collected by said fluid collecting pipe and conveyed thereby to said outlet pipe.

2. A gas to liquid heat exchanger combination comprising: a duct carrying hot gas, a hollow heat exchanger rotor horizontally mounted to rotate in said duct, a plurality of circular heat exchange fins mounted around the exterior of said rotor, a plurality of fluid distributing pipes coaxially mounted and spaced around the interior of said rotor intermediate the axis and wall thereof and perforated along their entire length, a supply of cold fluid connected at one end of each of said fluid distributing pipes to be uniformly distributed over the interior surface of said rotor to absorb heat therefrom, a fluid collecting pipe coaxially mounted in the center of said rotor and extending from one end thereof to the other, said collecting pipe being perforated along its entire length and connected at one end thereof to a fluid outlet pipe, and a high speed motor adapted to rotate said rotor at high speed to generate centrifugal force that distributes said cold fluid over the entire interior surface of said rotor to absorb heat therefrom, said heated fluid being forced to the center of said rotor to be collected by said fluid collecting pipe and conveyed thereby to said outlet pipe.

3. A gas to liquid heat exchanger combination which comprises: a hot gas duct, a hollow cylindrical rotor horizontally mounted for high speed rotation in said duct, a plurality of circular heat exchange fins mounted around the exterior of said rotor, a plurality of fluid distributing pipes coaxially mounted and spaced around the interior of said rotor intermediate the center and wall thereof, said fluid distributing pipes being perforated along their entire length to define flow ports therein, reservoir means at one end of said rotor in fluid connection with said fluid distributing pipes to supply cold fluid thereto, a central fluid collecting pipe mounted along the axis of rotation of said rotor in the interior thereof, said collecting pipe being perforated along its entire length to define fluid inlet ports, said collecting pipe being connected at one end thereof to a fluid outlet pipe, and a high speed motor adapted to rotate said rotor at a speed sufficient to generate centrifugal force to uniformly circulate cold fluid from said fluid distributing pipes over the entire interior wall surface of said rotor, said cold fluid being heated and forced to the center of said rotor into said fluid collecting pipe and conveyed thereby to said fluid outlet.

References Cited in the file of this patent

UNITED STATES PATENTS

| | | |
|---|---|---|
| 1,656,790 | Heijkenskjold | Jan. 17, 1928 |
| 2,037,490 | Vorkauf | Apr. 14, 1936 |
| 2,104,558 | Guggenheim | Jan. 4, 1938 |
| 2,249,301 | Simmon | July 15, 1941 |
| 2,311,984 | Guild | July 23, 1943 |
| 2,797,899 | Funk et al. | July 2, 1957 |
| 2,902,774 | Swaney | Sept. 8, 1959 |
| 2,919,904 | Cundiff | Jan. 5, 1960 |